United States Patent
Vandenbergh et al.

(10) Patent No.: US 6,715,030 B1
(45) Date of Patent: Mar. 30, 2004

(54) APPARATUS AND METHOD FOR STORING TRACK LAYOUT INFORMATION FOR PERFORMING QUICK WRITE OPERATIONS

(75) Inventors: Henk Vandenbergh, Lafayette, CO (US); Gregory William Peterson, Lyons, CO (US); Michael Steven Milillo, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 698 days.

(21) Appl. No.: 09/591,436

(22) Filed: Jun. 9, 2000

(51) Int. Cl.[7] .............................. G06F 12/06; G06F 3/06
(52) U.S. Cl. ..................... 711/111; 711/170; 360/48
(58) Field of Search ................................ 711/100, 111, 711/112, 113, 114, 162, 170, 202, 3; 714/1, 6; 703/23; 707/204; 360/48; 710/36

(56) References Cited

U.S. PATENT DOCUMENTS

| | | | | |
|---|---|---|---|---|
| 5,206,939 A | * | 4/1993 | Yanai et al. | 711/112 |
| 5,283,884 A | * | 2/1994 | Menon et al. | 711/113 |
| 5,535,372 A | * | 7/1996 | Benhase et al. | 711/100 |
| 5,555,389 A | * | 9/1996 | Satoh et al. | 711/100 |
| 5,568,628 A | * | 10/1996 | Satoh et al. | 711/113 |
| 5,632,012 A | * | 5/1997 | Belsan et al. | 714/6 |
| 6,330,655 B1 | * | 12/2001 | Vishlitzky et al. | 711/208 |

FOREIGN PATENT DOCUMENTS

EP 0550154 A1 7/1993 ........... G06F/12/08

OTHER PUBLICATIONS

"Direct Access Storage Cache Segment Management", IBM Technical Disclosure Bulletin, IBM Corp., New York, US, vol. 37, No. 8, Aug. 1, 1994.

* cited by examiner

Primary Examiner—Pierre-Michel Bataille
(74) Attorney, Agent, or Firm—Carstens, Yee & Cahoon LLP

(57) ABSTRACT

An apparatus and method for storing track layout information for performing update write operations is provided. In particular, the present invention provides an apparatus and method for storing track layout information based on cylinders which is then used to verify a quick write operation. A quick write operation is an update write operation in which track data need not be read from the physical storage device before performing an update of one or more records in the track. With the present invention, as tracks are written to or read from a storage device, such as a DASD or Non-Volatile Store (NVS), a cylinder table is populated with information identifying the tracks that meet criteria set for identifying tracks that are candidates for future quick write operations. The track layout information is stored on a cylinder basis. Thus, the amount of information that must be maintained in the cylinder table to identify tracks that are candidates for a quick write operation is reduced and the search time is improved.

52 Claims, 4 Drawing Sheets

APPARATUS AND METHOD FOR STORING TRACK LAYOUT INFORMATION FOR PERFORMING QUICK WRITE OPERATIONS

FIELD OF THE INVENTION

The present invention is directed to an apparatus and method for storing track layout information for performing update write operations. In particular, the present invention is directed to an apparatus and method for storing track layout information based on disk cylinders which is then used to verify a quick write operation.

BACKGROUND OF THE INVENTION

Use of Direct Access Storage Devices (DASDs) in a data processing system requires performance of certain Input/Output (I/O) functions. Data must be transferred between the DASD and the host processor. Such DASDs are often connected to a host processor through an I/O channel. The host Central Processing Unit (CPU) operating system initiates data transfer with a command to the I/O channel. This shifts control to a series of Channel Command Words (CCWs) that are sent from the CPU over the channel to the DASD controller for effectuating data movement across the interface.

The channel forwards each CCW to the controller for a selected DASD. Once the channel passes a command to a particular controller, the command must be interpreted and the elements of the command must be executed by the DASD. The various functions of channel, controller and command interpretation can be integrated with the host processor or distributed between the host and the mechanical storage components of the DASD.

The DASD controller performs several functions, including the interpretation and execution of CCWs forwarded by a channel from the host CPU. Seek commands position a DASD access mechanism. Search commands cause comparison between data from main CPU storage and data stored on specified DASD areas. Read commands cause data copies to be transferred from DASD storage to main CPU storage and checked for validity.

Another important function of the DASD controller is the prescription of data storage format for the DASD. Such a format includes provisions for certain "non-data" information such as the track address, record address, and so forth. There are also unused spaces and error correction codes prescribed for the DASDs commonly encountered in widespread use.

Conventional track formats include an index point on each track of the recording surface indicating the physical beginning of the track. Also, on each track, there is normally one Home Address (HA) that defines the physical location of the track and the condition of the track. The HA normally contains the physical track address, a track condition flag, a cylinder number (CC) and a head number (HH). The combination of the cylinder number and head number indicates the track address and is commonly expressed in the form CCHH. The HA contains the "physical" track address, which is distinguished from a "logical" track address. The physical and logical track addresses may differ for records stored in the DASD tracks.

The first record following the HA is commonly a track descriptor record, sometimes referred to as R0. One or more user data records follow R0 on the track. The first part of each user record is an "address marker" that enables the controller to locate the beginning of the record when reading data from DASD. Each user record is commonly formatted in either a "count-data" (CD) or a "count-key-data" (CKD) format. The only difference between the CD and CKD formats is the presence of key fields and key length data in the CKD formatted record. Both are herein henceforth referred to as CKD records.

The CKD record consists of a count field, an optional key field and a variable-length data field. The typical count field is of the form CC (two bytes of cylinder number), HH (two bytes of head number), R (one byte of record number), KL (one byte of key length), and DL (two bytes of data length). Thus, each CKD record is self-identifying. The CCHH in the count field (called "logical" CCHH) is typically the same as the cylinder and head numbers in the HA for the track containing the record (called "physical" CCHH), although not necessarily. Thus, a CKD track consists of the track header (HA and R0) followed by some number of CKD records. The CKD record numbers (R) may, but need not, increment along the track in a monotonic pattern of one, two, three, and so on.

In the typical situation, user data is written or read in a data field of a CKD record in some track on some DASD. The channel specifies the device and the track within the device of interest. The channel may also specify the rotational position on the track from which to begin searching for the record having the data field to be read or written. This is accomplished by specifying a search parameter (five bytes in the form CCHHR) for use by the DASD controller to match against count fields in the track of interest. When the DASD controller finds a CKD record on the track with a count field that matches the search parameter, it then either reads or writes the corresponding data field.

The fundamental feature of importance to this invention is that the disk controller is not permitted to read or write until it has verified the existence of a count field in the track that matches the channel search parameter. This means that a write command will force the channel to wait until the matching record is actually located on the rotating DASD medium. Of course, such a read wait state is reasonable because a CKD record cannot be read until located, but the only overriding reason for holding the CPU channel merely to locate the proper record for updating is to ensure error recovery.

The prior art is replete with methods for reducing and eliminating the host CPU wait states necessitated by DASD accesses for read and write. A DASD cache is a high-speed buffer store used to hold portions of the DASD address space contents in a manner that reduces channel wait states. U.S. Pat. No. 4,603,380 discloses a method for DASD cache management that reduces the volume of database transfers between DASD and cache, while avoiding the complexity of managing variable length records in the cache. This is achieved by forcing the starting point for staging a record to the beginning of the missing record and, at the same time, allocating and managing cache space in fixed length blocks.

Some DASD controllers such as the IBM 3990 DASD controller, have some amount of relatively fast Non-Volatile Store (NVS) for storing records that have been written by the host system but not yet written to the DASD medium by the DASD controller. The NVS is additional to the high speed cache buffer store commonly included in the typical disk controller. DASD controllers having both cache and NVS are said to perform "fast-write" operations.

A fast-write operation proceeds as follows, if a track record to be updated is already in cache (that is, a record count field is found in cache that matches the search parameters provided by the host computer), the cache copy of the record is updated in cache and another updated copy is made in NVS. The two copies of modified records are maintained for error recovery purposes to avoid single points of failure. After copying to NVS, the DASD controller returns a completion signal to the host system, freeing the host CPU to proceed with the next channel operation. Such an operation is called a "fast-write hit" and is completed well before the updated record is actually written to the DASD. At some later time, the DASD controller asynchronously de-stages the updated record to disk from the cache and then removes the record from NVS and optionally cache as well.

This explanation, made in terms of a single record, actually is better understood in terms of a single track. DASD controller cache memory is generally organized in fixed block sizes. Because a single track is often a fixed size while single records are not, the typical practice is to stage and de-stage data from cache to DASD and back again in single track increments.

With a "fast-write hit", the DASD controller can eliminate the disk access time from the channel write operation as perceived by the host CPU. The actual de-stage of the modified record from cache to disk can be accomplished at a more convenient time; for example, when the DASD controller is idle, or when there is other work to be done against the same track or cylinder as the one holding the modified record.

If the record to be updated was not originally located in cache, however, the "fast-write" operation becomes a "fast-write miss" and the DASD controller must then locate the record on a disk before releasing the channel. That is, a fast-write miss is treated as if there is no cache after the disk controller locates the track. It must search the count fields or records in the track starting at any specified rotational position, and search for a matching count field. Once the matching count field is located, the DASD controller updates the corresponding data field on the DASD and, only then, returns a completion signal to the host CPU. With other systems, the track may first be staged and an update write operation is performed as if it were a fast write-hit operation. The controller may also read the entire track into cache at the same time in anticipation of subsequent updates to records on the same track.

It will be appreciated that a "fast-write miss" is much slower than a "fast-write hit" because it includes a disk access delay as part of the response time seen by the host CPU. Thus, the controller functions as slowly on a fast-write miss as it does without the fast-write capability. Thus, for applications exhibiting poor write-hit ratios, use of DASD controllers with fast-write capability will not materially improve DASD channel efficiency.

One solution to this problem is to keep information about each track in processor and/or cache memory. For example, European Patent Application EP 0 550 154 A1, entitled "Method of Updating Records," provides a track table that can be utilized to locate a track on a Direct Access Storage Device (DASD). The track table is indexed by track. Thus, the track table according to EP 0 550 154 A1 at a minimum stores for each track the cylinder and head number for each track's record header, and the record length for each record on that track.

As the number of disks in DASD systems increase, the amount of storage space just to store the track table becomes problematic. For example, a system comprised of 1024 devices, each device having 50,085 tracks, requires a minimum of 196 MB of memory space to store the track table. If the number of devices increases four times to 4096, the minimum amount of require memory space rises to 784 MB. In addition, the amount of processing time necessary to search the table for a track listing increases.

Thus, it would be advantageous to have an apparatus and method for storing track information, for use in validating an update write operation, in which the amount of memory space required for the track information is a minimum.

SUMMARY OF THE INVENTION

The present invention provides an apparatus and method for storing track layout information for performing update write operations. In particular, the present invention provides an apparatus and method for storing track layout information based on cylinders which is then used to verify a quick write operation.

With the present invention, as tracks are written to or read from a storage device, such as a DASD, or written to a Non-Volatile Store (NVS), a cylinder table is populated with information identifying the tracks that meet criteria set for identifying tracks that are candidates for future quick write operations. The criteria are set to identify those tracks that have a layout that is predictable.

The term "quick write" operation is intended to mean an update write operation in which track data need not be read from the physical storage device before performing an update of one or more records in the track. A track or record may be a candidate for a quick write operation and may not be a candidate for a fast write operation because the track is not already in cache but need not be read from the physical storage device.

At some time later, if the same track is the subject of an update write operation, it is determined whether the update write track has the same layout as that identified in the cylinder table. If so, the quick write operation is enabled. If not, a quick write operation is not enabled and the track must be staged.

The track layout information is stored on a cylinder basis. Thus, the amount of information that must be maintained in the cylinder table to identify tracks that are candidates for future quick write operations is reduced. As a result, the amount of computing time necessary to perform a track update write validation for determining if an update write operation should be allowed, is reduced since the amount of information searched is reduced.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
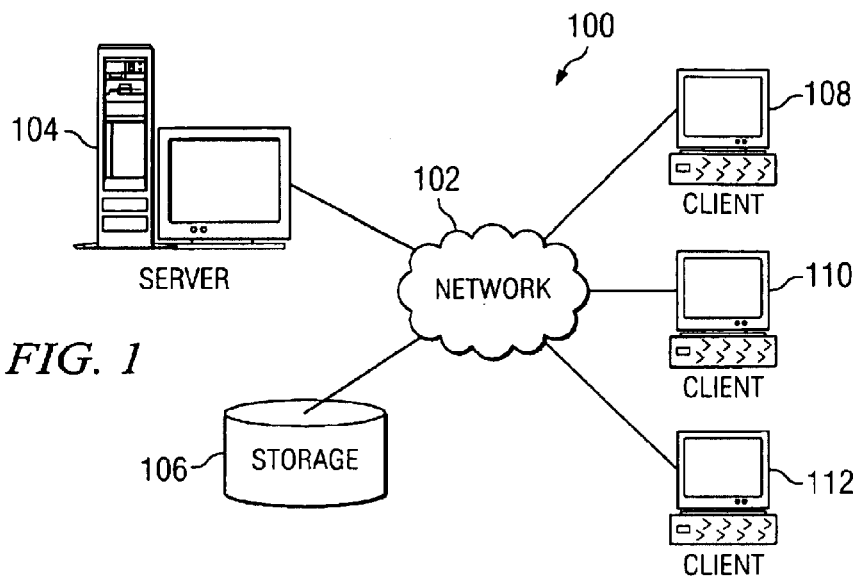
FIG. 1 is an exemplary diagram of a distributed data processing system in which the present invention may be implemented.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
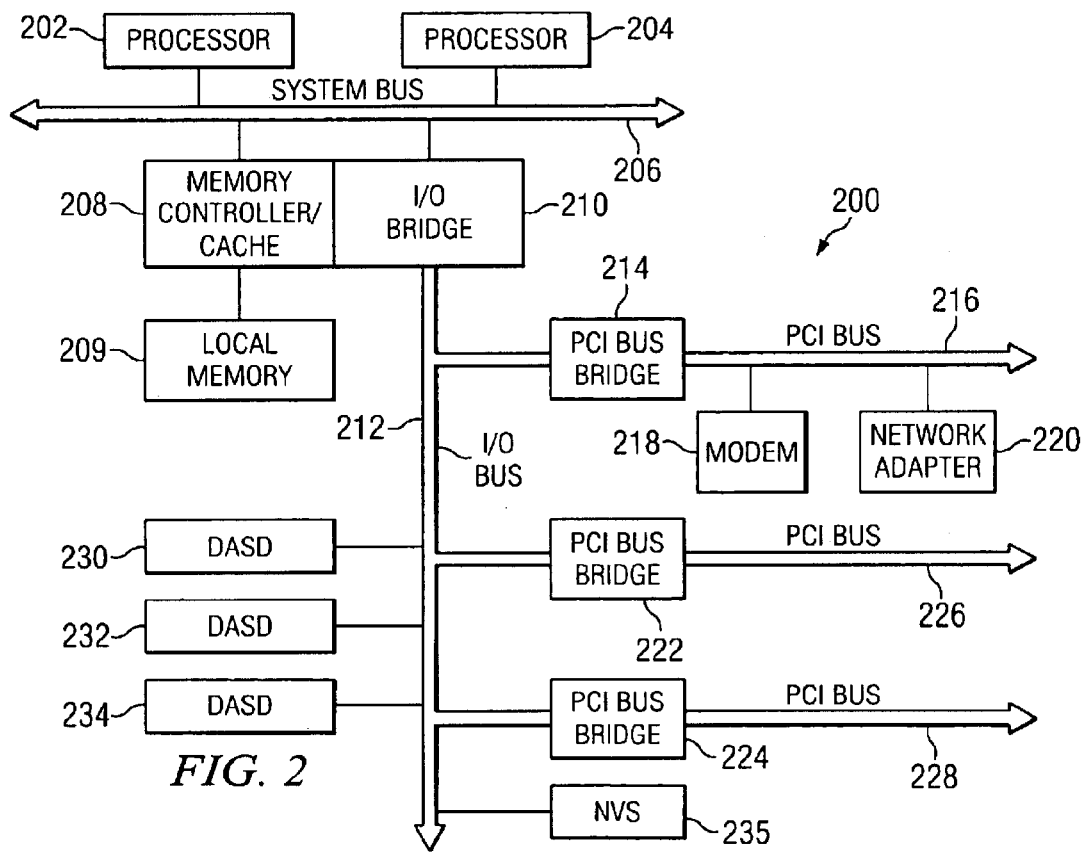
FIG. 2 is an exemplary diagram of a data processing apparatus in which the present invention may be implemented.

Referring to FIG. 2, a block diagram of a data processing apparatus on which the present invention may be implemented is shown. The data processing apparatus of FIG. 2 may be implemented, for example, as server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218 and network adapters 220 may be connected to PCI bus 216. Typical PCI bus implementations will support four PCI expansion slots or add-in connectors.

Communications links to network computers 108–112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers.

A number of Direct Access Storage Devices (DASDs) 230–234, such as hard drives, may also be connected to I/O bus 212 as depicted, either directly or indirectly. The DASDs 230–234 store tracks of data records which may be updated by update write operations. In addition, a Non-Volatile Store (NVS) 235 may be provided for storing tracks of data records which may be updated by update write operations. The NVS 235 may store the tracks in memory, update the memory resident versions of the tracks, and write the tracks to one or more of the DASDs 230–234 at a later time.

In order for an update write operation to proceed, the presence of the data record must first be validated, as discussed above. The term "quick write" operation is intended to mean an update write operation in which track data need not be read from the physical storage device before performing an update of one or more records in the track. Thus, track or record may be a candidate for a quick write operation and may not be a candidate for a fast write operation because the track is not already in cache but need not be read from the physical storage device due to the track layout having been stored in the cylinder table of the present invention, as discussed in more detail hereafter.

The validation first looks to memory cache 208 to determine if the track data records are loaded in memory cache 208. If so, the data record presence is easily validated and updated in the memory cache 208 as a fast write hit, for example. If not, the data record information must first be validated by some means.

With the present invention, a cylinder table is provided that stores information about each cylinder of the DASDs 230–234. The cylinder table may be stored, for example, in the local memory 209 or memory cache 208. The cylinder table stores information identifying the tracks in a cylinder, their data length, number of records, and other information identifying the track. In this way, the cylinder table may be searched for a particular track and record, the data length validated, and an update write operation may be initiated.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
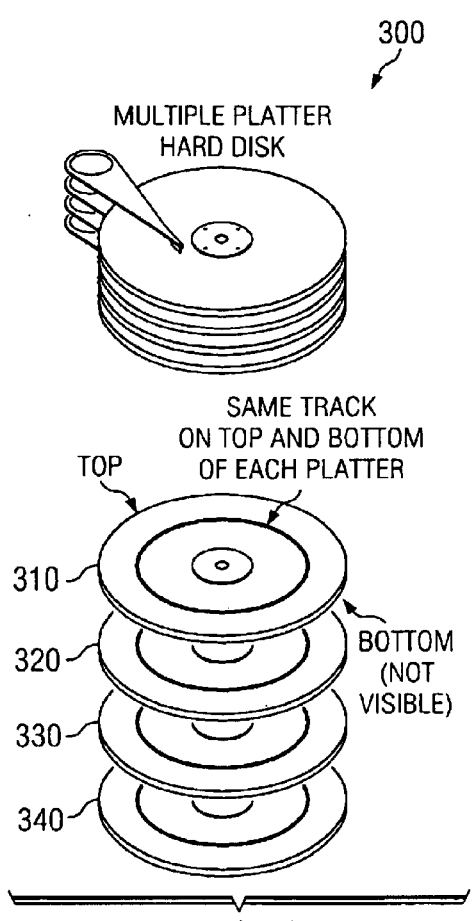
FIG. 3 is an exemplary diagram of a disk storage device according to the present invention.

FIG. 3 is an exemplary diagram of a multiple platter hard disk drive, such as DASD 230, according to the present invention. As shown in FIG. 3, the multiple platter hard disk 300 is comprised of a plurality of platters 310–340, each having a top and bottom side. The platters 310–340 provide a medium upon which tracks of data are written. A track is a storage channel. On disks, tracks are concentric circles (hard and floppy disks) or spirals (CDs and videodiscs). Their format is determined by the specific drive they are used in. On magnetic devices, bits are recorded as reversals of polarity in the magnetic surface. On CDs, bits are recorded as physical pits under a clear, protective layer.

A cylinder is the aggregate of all tracks that reside in the same location on every disk surface (top and bottom). When storing data, the operating system may fill an entire cylinder before moving to the next one. In this case, the access arm remains stationary until all the tracks in the cylinder have been read or written.

Thus, a cylinder may be comprised of a plurality of tracks and each track may be comprised of a plurality of records. Hence, by storing track information on a cylinder basis rather than a track or record basis, the amount of information necessary to identify the layout of the tracks and records in the system is greatly reduced.

Accordingly, a cylinder table that stores information identifying the tracks and records associated with the cylinders of a disk drive system will require less memory space than that of a track table or record table. The present invention provides an apparatus and method for maintaining a cylinder table and utilizing the cylinder table to validate update write operations.

With the present invention, as tracks are written to or read from a DASD, such as a hard disk storage device, or written to a NVS, entries into a cylinder table are created that identify the cylinder number, the track number, the record number and the data length of the records in the track. Thereafter, if an update write operation is initiated, the cylinder table may be searched for the record(s) that are to be validated and updated. The terms "record length," "data length of the records" and "block data" are used interchangeably herein to refer to the length of data for each record in a track.

The cylinder table is populated as tracks are written or read from a DASD, such as hard disk 300, or written to NVS 235. However, not every track is represented in the cylinder table. For example, some tracks may not have been read or written. In addition, tracks that do not meet a number of predetermined criteria will also not be represented in the cylinder table as quick write candidates.

The following are example criteria for a preferred embodiment of the present invention. Those of ordinary skill in the art will appreciate that other criteria in addition to, or in place of, the criteria set forth below are intended to be within the spirit and scope of the present invention.

First, the number of records in the track must be greater than one. Every track has at least one record, the R0 record. The preferred embodiment of the present invention assumes that all R0 records have the same size, however, alternative embodiments of the present invention may make use of different length R0 records. Thus, tracks having only the R0 record need not be included in the cylinder table due to the fact that update writes of the R0 record are not candidates for quick write operations. A track must have a data record, i.e. a record other than the R0 record, to be a candidate for a quick write operation.

The track should not contain records having key fields. A key field is a field identifying a searchable key for identifying a track. Because there may be numerous tracks represented in the cylinder table for each cylinder, keeping track of the key fields for each track will greatly increase the amount of data maintained in the cylinder table. Furthermore, the tracks may be identified by their cylinder table entry and the key field is not necessary for identifying the track. Thus, in order to reduce the size of the cylinder table, key fields are not maintained. While maintaining key field information is not desirable with the present invention, the ability to do so is intended to be within the spirit and scope of the present invention. Thus, an alternative embodiment may include the key field information in the cylinder table.

The record in position zero, i.e. R0, of the track must be the same length for each track in the cylinder. In a preferred embodiment the length is set to 8 bytes, however, any length suitable may be chosen without departing from the spirit and scope of the present invention. This criteria is included to force symmetry in the tracks of the cylinders included in the cylinder table and to reduce the size of the cylinder table.

All data records must be the same data size, also referred to as block size and record length. Since the cylinder table stores information regarding the tracks and records from a cylinder size level, information regarding the data size of each individual data record in the track is not maintained. Thus, in order to reduce the amount of data stored in the cylinder table, the constraint that all the data records in the track must be the same data size is used.

The track must be full of data records and the data records must be numbered 1 to n, i.e. they must be consecutive. This criteria is provided to insure that when an quick write operation is to be validated for data record 14, for example, that a data record 14 actually exists. In other words, this criteria forces the formatting of each track to be identical such that one track cannot be formatted to have 10 data records while all the others have a format consisting of 15 records. If data record 14 were the subject of a quick write operation in the former case, an error would be encountered.

The count field head number must be the same as the home address head number. This requirement states that the track head number must correspond with the physical location head number. In other words, that the physical location identifier in the track information is consistent with the actual physical location.

And finally, the count field cylinder number must be the same for each record in the track. This requirement states that all of the records in the track belong to the same cylinder. This requirement allows for moving of tracks from one physical location to another. However, a track having records that have different cylinder numbers does not satisfy this requirement.

If a track meets all of the above criteria, the track definition, i.e. the identification information for the track, is added to the cylinder table. The above criteria are reasonable for the vast majority of tracks that are written to and read from DASDs and written to NVS. Again, the purpose of the update write operation according to this invention is to increase the speed of the data processing system in updating the records of tracks when possible. Not all records will be eligible for the quick write operation. However, since the majority of records will typically meet the above criteria, the speed of the data processing system will increase.

Figure 4:
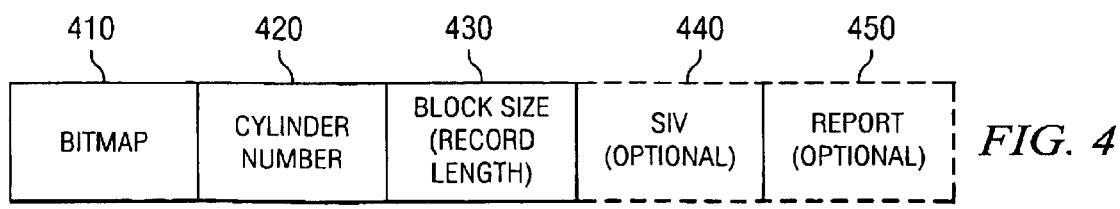
FIG. 4 is an exemplary diagram of a cylinder table entry according to the present invention.

FIG. 4 is an example of a cylinder table entry according to the present invention. As shown in FIG. 4, the cylinder table entry includes a 15-bit bitmap 410 that identifies which of the tracks, typically identified as tracks 0–14, on the cylinder follow the track layout defined in the cylinder table entry. The cylinder table also includes the cylinder number 420 and the record length 430 for track data records.

In addition, the cylinder table entry may also optionally include a base Seed Independent Value (SIV) entry 440 and a report entry. The Seed Independent Value is an identifier for the track that may be used to uniquely identify the track regardless of whether the track is moved from one physical location to another. The SIV is used during compression and decompression to provide a tag by which data can be verified when it is decompressed.

The report entry 450 contains a reporting bitmap identified for each track on the cylinder that the track layout for the track is known, whether the track follows the described track layout for this cylinder or not. The report bitmap may be used to report in statistical counters how many quick writes could not be accepted because the track layout was not known or how many could not be accepted because the track does not conform to a quick write candidate layout.

Initially, the cylinder table will be empty, however the cylinder table will be populated as tracks are written to or read from the DASD or written to the NVS. Eventually, when all cylinders are written to or read from the DASD or written to the NVS, the cylinder table will have one entry per cylinder. For purposes of the following description, only populating the cylinder table during writing to a DASD will be considered. However, as noted above, the present invention is applicable to reading of data tracks from DASDs and writing of data tracks to NVS.

If, as a track is being written to the DASD, e.g. a hard disk, an entry for the cylinder is not included in the cylinder table, an entry is created and stored in the cylinder table. If an entry in the cylinder table already exists, the processor 202 or 204 must make a number of determinations to identify whether the track is a candidate for future quick write operations.

First a check is made to see if the bitmap for the track being written already exists. If the bitmap for the particular track is already set, i.e. the track has already been written to the hard disk, a check is made to see if the format of this track has been changed. In other words, if the track format of the track that is currently being written has a different layout than that indicated in the cylinder table.

If the format has not changed, a determination is made as to whether the track format agrees with the cylinder table entry for the track already stored. If not, the cylinder table entry is reset and quick write ability is disabled.

If the bitmap for the track is not set, or if the format for the track has been changed, a determination is made as to whether the track format matches the cylinder format, i.e. does the track contain records of a size that match the cylinder table entry block size. If the track format does not match the cylinder format, the cylinder table entry is reset for this cylinder. The cylinder table information for this cylinder is then set in this cylinder table entry based on the format of the track being written.

Thereafter, or if the track format does match the cylinder format, the bitmap for the track in the cylinder table entry is set. The cylinder table entry is then stored in the cylinder table and the operation ends.

The track information described above is obtained from metadata in the cache describing the data stored in the track. The metadata includes such information as the record sizes, number of records, physical address of the track, and the like. This metadata is determined when a track is written or read from a DASD or written to the NVS and is used to perform the checks described above to determine if a track is eligible for future quick writes.

When an update write operation is initiated, the processor 202 or 204 must first validate the records being updated. In order to validate a record, it is first determined whether the record block size, i.e. the record size or block size, is provided. If the record block size is provided, the cylinder table entry for this cylinder is retrieved from the cylinder table.

A determination is then made as to whether the bitmap for the track is set for that cylinder table entry. If the bitmap is set for that track, a determination is then made as to whether the write command block size, i.e. the block size of the record that is being updated, is equal to the block size provided for in the cylinder table entry. If not, the quick write operation is not allowed to proceed due to the incorrect block size.

However, if the write command block size is equal to the cylinder table block size, the quick write operation is allowed to proceed without staging the track. In other words, the quick write operation is performed directly to the track on the hard disk, or to the track in the NVS, and is not delayed by the track data having to be read into memory cache 208. If, however, the block size is not provided or the bitmap is not set for the track corresponding to the record to be updated, the track is staged.

In this way, since information is stored on a cylinder basis, the number of entries required to provide adequate information for validation of update write operations is greatly minimized over the prior art. In addition, update write operations may be quickly validated due to the minimal size of the cylinder table stored in memory.

Figure 5:
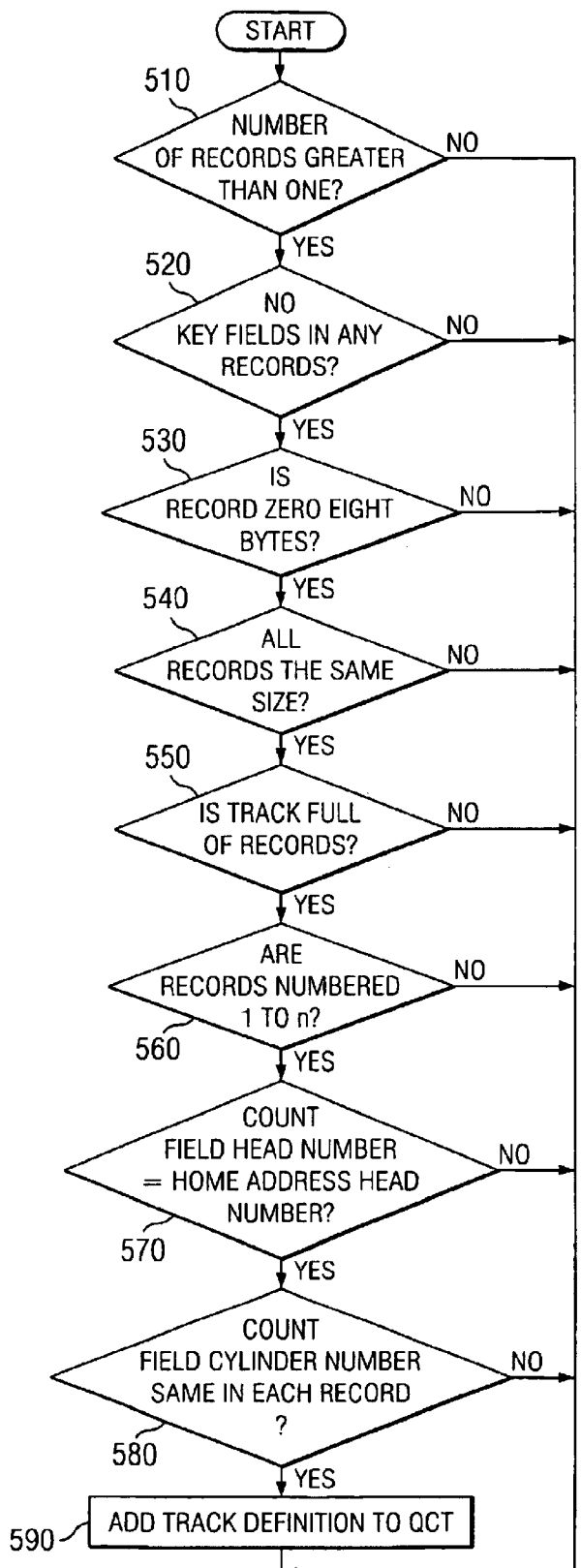
FIG. 5 is a flowchart outlining an exemplary operation of the present invention when determining if a track is a candidate for future quick-write operations.

FIG. 5 is a flowchart outlining an exemplary operation of the present invention when determining if a track is qualified for future quick write operations. As shown in FIG. 5, the operation starts with a determination whether the number of records is greater than 1 (step 510). If the number of records is greater than 1, a determination is made as to whether there are no key fields in any other records of the track (step 520). If there are no key fields in any of the records of the track, a determination is made as to whether record 0, i.e. R0, is 8 bytes in size (step 530).

If so, a determination is made as to whether all the records are of the same size (step 540). If all the records are of the same size, a determination is made as to whether the track is full of records or whether the track is partially empty (step 550). If the track is full of records, a determination is made as to whether the records are consecutively numbered from 1 to n (step 560).

If the records are numbered consecutively from 1 to n, a determination is made as to whether the count field head numbers equal to the home address head number (step 570). If so, a determination is made as to whether the count field cylinder number is the same for each record in the track (step 580). If so, the track definition is added to the cylinder table entry (step 590). If any of the determinations outlined above result in a negative outcome, the track is not a valid track for future quick write operations and the operation ends.

The above determinations are performed for identifying tracks that are candidates for future quick write operations. Once a track has been identified as a candidate for future quick write operations, the track information must be stored in the cylinder table.

Figure 6:
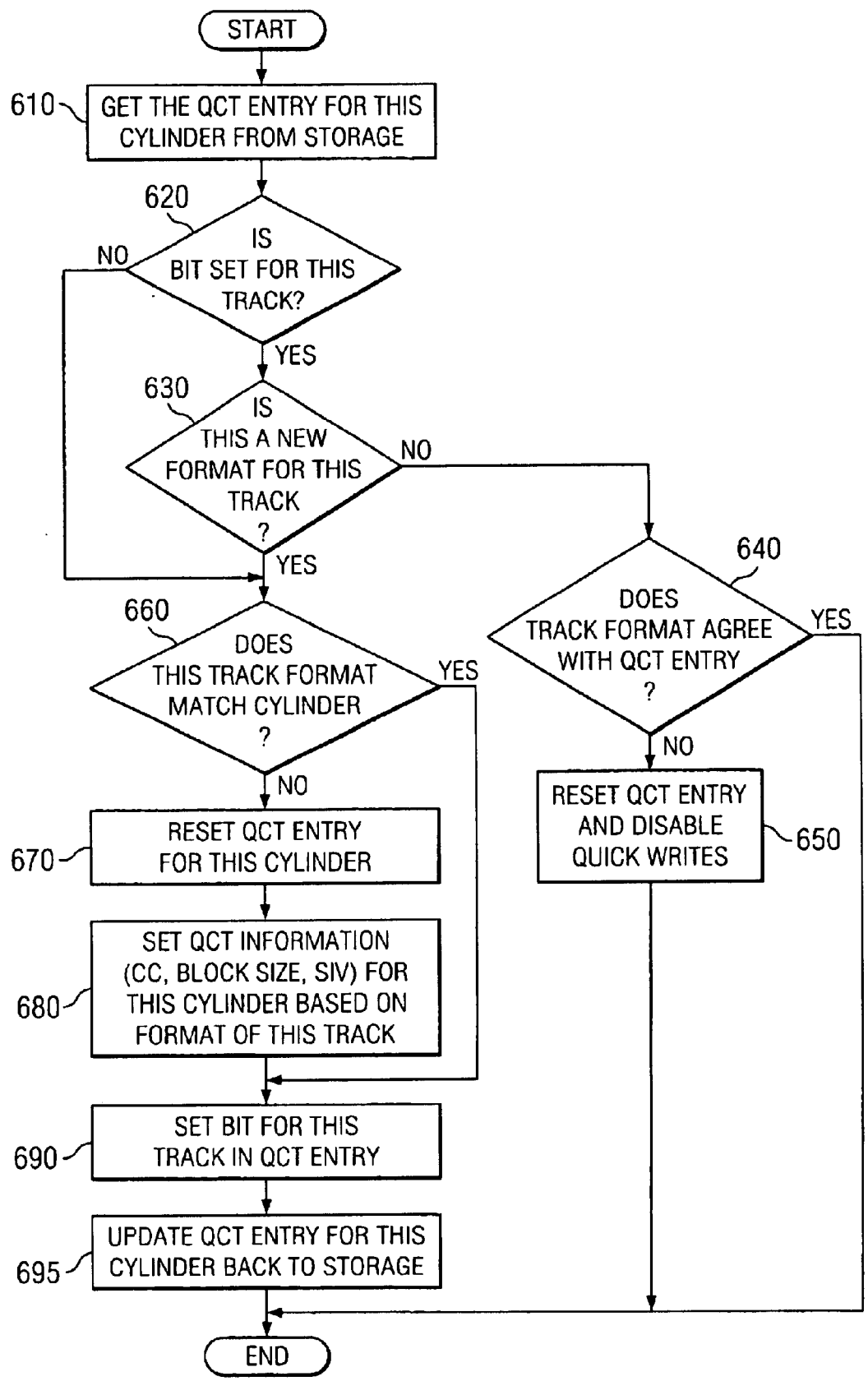
FIG. 6 is a flowchart outlining an exemplary operation of the present invention for adding a track definition to a cylinder table.

FIG. 6 is a flowchart outlining an operation of the present invention when adding a track definition to a cylinder table entry. As shown in FIG. 6, the operation starts with the cylinder table entry for the particular cylinder of the track that is being retrieved from storage (step 610). A determination is then made as to whether the bitmap is set for the particular track that is being written (step 620).

If the bitmap already exists for the particular track being written, a determination is being made as to whether the track being written represents a new format for the track or whether the track is not a new format (step 630). If the track is not a new format, then a determination is made as to whether the track format agrees with the cylinder table entry format as it is stored in the storage device (step 640). Step 640 is essentially a "sanity" check and thus, the vast majority of the time should not result in the track format not agreeing with the cylinder table entry format.

If the track format does not agree with the cylinder table entry, the cylinder table entry is reset and the update write operation is disabled (step 650). If the track format does agree with the cylinder table entry format, no further action is necessary and the operation ends.

If the bitmap is not set for the particular track being written in step 620, or if the track does not represent a new format for the track in step 630, a determination is made as to whether the track format matches the cylinder table entry format (step 660). If the track format does not match the cylinder table entry format, the cylinder table entry for the cylinder is reset (step 670) and the cylinder table information for the cylinder is set based on the format of this track (step 680).

Thereafter, or if the track format does match the cylinder table entry format, the bitmap for the track in the cylinder table entry is set (step 690) and the cylinder table entry for this cylinder is updated in the storage device (step 695). The operation then ends.

The above operations are performed to store track definitions in the cylinder table. These track definitions are used to determine if an update write operation is a valid quick write operation. Thus, when an update write operation is initiated, the processor 202 or 204 must first validate the update write operation as a valid quick write operation using the cylinder table entries that contain the track definitions.

Figure 7:
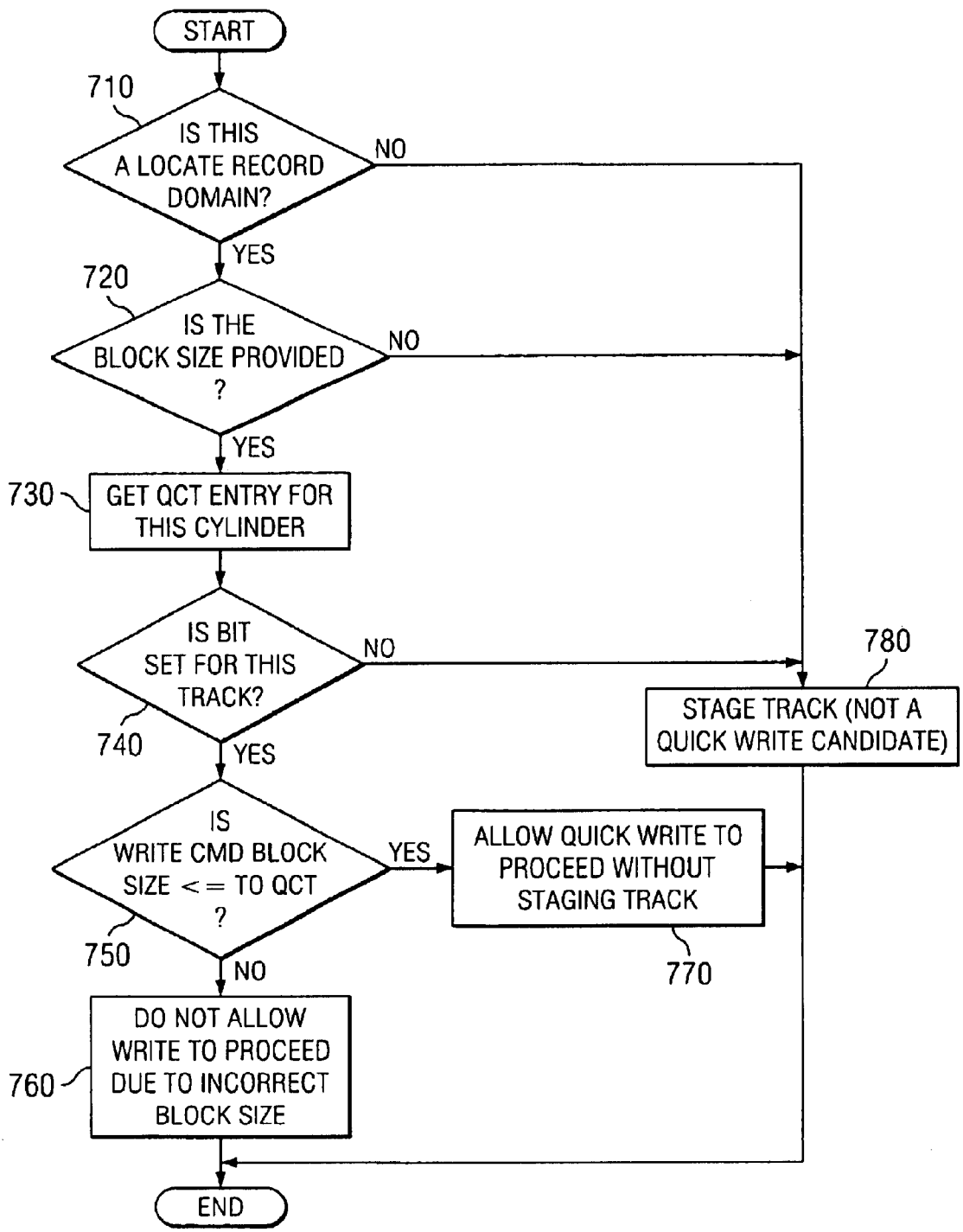
FIG. 7 is a flowchart outlining an exemplary operation of the present invention for performing an update write validation using the cylinder table of the present invention.

FIG. 7 is a flowchart outlining an exemplary process of the present invention when validating an update write operation as a quick write operation. As shown in FIG. 7, the process begins with a determination as to whether the write operation is in a locate record domain (step 710). The locate record domain identifies the scope of operations controlled by a locate record command. The locate record command establishes the orientation state specified by locate record parameter information before any data transfers to or from the storage device are performed. The location and number of records to process and the operations to perform are specified in the locate record command. The locate record domain is in effect for the number of records or tracks that is specified in the locate record parameters. Thus, the locate record domain provides an indication of the record being updated and the block size of the record.

If the write operation is in the locate record domain, it is then determined whether the block size of the write operation is provided (step 720). If the block size is provided, the cylinder table entry for this cylinder is retrieved from storage (step 730).

It is then determined whether the bitmap is set for the particular track being written (step 740). If the bitmap for the particular track being written has already been set, the determination of whether the write command block size is equal to the cylinder table block size is made (step 750).

If the write command block size is equal to the cylinder table entry block size, the update write operation is allowed to proceed as a quick write operation without staging of the track (step 770). However, if the write command block size is not equal to the cylinder table block size, the update write operation is not allowed to proceed due to incorrect block size (step 760). Then the process ends.

If either the write operation is not located in the locate record domain (step 710), the block size is not provided (step 720), or the bitmap is not set for the particular track being written (step 740), the track is staged (step 780) and the process is then ended.

With the present invention, the amount of storage space necessary to store sufficient information for validation of update write operations is greatly minimized due to the fact that information is stored based on the cylinder basis. In addition, validation of update write operations is quickly performed due to the minimal size of the cylinder table.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for validating an update write operation as a quick operation for a data track, comprising:

a processor;

a storage device, wherein the processor determines if layout information for the data track is present in a cylinder table stored in the storage device and if layout information for the data track is present in the cylinder table, the processor determines if a data track block size for the data track is equal to a cylinder table entry block size, and wherein the processor validates the update write operation as a quick write operation if the data track block size is equal to the cylinder table entry block size; and wherein if layout information for the data track is not present in a cylinder table, the processor determines if the data track is a candidate for future quick write operations.

2. The apparatus of claim 1, wherein if the data track is a candidate for future quick write operations, the processor determines whether a cylinder table entry for the data track is present in the cylinder table.

3. The apparatus of claim 2, wherein if a cylinder table entry is not present in the cylinder table, the processor creates and stores a cylinder table entry in the cylinder table in the storage device for the data track.

4. The apparatus of claim 2, wherein if a cylinder table entry is present in the cylinder table, the processor determines whether a layout of the data track conforms with a layout of the cylinder table entry.

5. The apparatus of claim 4, wherein if the layout of the data track conforms to the layout of the cylinder table entry, the processor adds the data track to the cylinder table entry.

6. The apparatus of claim 5, wherein the processor adds the data track to the cylinder table entry by setting a bit in a track bitmap.

7. The apparatus of claim 5, wherein the processor adds the data track to the cylinder table entry by setting a bit in a track bitmap and setting a track block size.

8. The apparatus of claim 7, wherein the processor adds the data track to the cylinder table entry by further setting a seed independent value for the track.

9. The apparatus of claim 7, wherein the processor adds the data track to the cylinder table by further setting a reporting bit for the track.

10. The apparatus of claim 1, wherein the processor determines if layout information for the data is present in the cylinder table by determining if a bit in a track bitmap in the cylinder table entry identifies the data track.

11. A method of validating an update write operation as a quick write operation for a data track, comprising:
- determining if layout information for the data track is present in a cylinder table;
- if layout information for the data track is present in the cylinder table, determining if a data track block size for the data track is equal to a cylinder table entry block size;
- validating the update write operation as a quick write operation if the data track block size is equal to the cylinder table entry block size; and
- wherein if layout information for the data track is not present in a cylinder table, a determination is made as to whether the data track is a candidate for future quick write operations.

12. The method of claim 1, wherein if the data track is a candidate for quick write operations, a determination is made as to whether a cylinder table entry for the data track is present in the cylinder table.

13. The method of claim 12, wherein if a cylinder table entry is not present in the cylinder table, a cylinder table entry in the cylinder table is created for the data track.

14. The method of claim 12, wherein if a cylinder table entry is present in the cylinder table, a determination is made as to whether a layout of the data track conforms with a layout of the cylinder table entry.

15. The method of claim 14, wherein if the layout of the data track conforms to the layout of the cylinder table entry, the data track is added to the cylinder table entry.

16. The method of claim 15, wherein the data track is added to the cylinder table entry by setting a bit in a track bitmap.

17. The method of claim 15, wherein the data track is added to the cylinder table entry by setting a bit in a track bitmap and setting a track block size.

18. The method of claim 17, wherein the data track is added to the cylinder table by further setting a seed independent value for the track.

19. The method of claim 17, wherein the data track is added to the cylinder table by further setting a reporting bit for the track.

20. The method of claim 1, wherein if the data track block size for the data track is not equal to a cylinder table entry block size, the update write is rejected.

21. The method of claim 1, wherein determining if layout information for the data track is present includes determining if a bit in a track bitmap in the cylinder table entry identifies the data track.

22. A method of creating a cylinder table for a direct access storage device, comprising:
- determining if a data track is a candidate for a future quick write operation;
- creating a cylinder table entry for a cylinder corresponding to the data track if the data track is determined to be a candidate for a future quick write operation; and
- wherein determining if the data track is a candidate for a future quick write operation includes determining if a number of records in the data track are greater than one and determining if a record length of a record in position zero is a predetermined size.

23. The method of claim 22, wherein determining if the data track is a candidate for a future quick write operation further includes determining if records of the data track have a same data size.

24. The method of claim 22, wherein determining if the data track is a candidate for a future quick write operation further includes determining if the data track is full of records and determining if the records are consecutive.

25. The method of claim 22, wherein determining if the data track is a candidate for a future quick write operation further includes determining if a count field head number for the data track is the same as a home address head number.

26. The method of claim 22, wherein determining if the data track is a candidate for a future quick write operation further includes determining if a count field cylinder number for all records in the data track are the same.

27. The method of claim 22, wherein the cylinder table entry includes a field for identifying data tracks in a cylinder, a field for identifying a cylinder number of the cylinder, and a field for identifying a record length of records in data tracks of the cylinder.

28. The method of claim 27, wherein the cylinder table entry further includes a field for a seed independent value and a report entry.

29. The method of claim 27, wherein the report entry identifies whether a quick write operation could not be accepted because either the data track layout was not known or the data track does not conform with a data track layout of a quick write candidate.

30. The method of claim 22, wherein creating the cylinder table entry includes setting a bit in a track bitmap to identify the data track.

31. The method of claim 22, wherein creating the cylinder table entry includes setting a bit in a track bitmap to identify the data track and setting a track block size.

32. The method of claim 31, wherein creating the cylinder table entry further includes setting a seed independent value for the data track.

33. The method of claim 31, wherein creating the cylinder table entry further includes setting a reporting bit for the track.

34. A computer program product in a computer readable medium for validating an update write operation as a quick write operation for a data track, comprising:
- first instructions for determining if layout information for the data track is present in a cylinder table;
- second instructions for determining if a data track block size for the data track is equal to a cylinder table entry block size, if layout information for the data track is present in the cylinder table;
- third instructions for validating the update write operation as a quick write operation if the data track block size is equal to the cylinder table entry block size; and
- wherein the first instructions further include fourth instructions for determining whether the data track is a candidate for future quick write operations, if layout information for the data track is not present in a cylinder table.

35. The computer program of claim 34, wherein the fourth instructions include fifth instructions for determining whether a cylinder table entry for the data track is present in the cylinder table, if the data track is a candidate for future quick write operation.

36. The computer program product of claim 35, wherein the fifth instructions further include instructions for creating a cylinder table entry in the cylinder table for the data track, if a cylinder table entry is not present in the cylinder table.

37. The computer program product of claim 35, wherein the fifth instructions further include sixth instructions for determining whether a layout of the data track conforms with a layout of the cylinder table entry, if a cylinder table entry is present in the cylinder table.

38. The computer program product of claim 37, wherein the sixth instructions further include instructions for adding the data track to the cylinder table entry, if the layout of the data track conforms to the layout of the cylinder table entry, if a cylinder table entry.

39. The computer program product of claim 38, wherein the data track is added to the cylinder table entry by setting a bit in a track bitmap.

40. The computer program product of claim 38, wherein the data track is added to the cylinder table entry by setting a bit in a track bitmap and setting a track block size.

41. The computer program product of claim 40, wherein the data track is added to the cylinder table entry by further setting a seed independent value for the track.

42. The computer program product of claim 40, wherein the data track is added to the cylinder table entry by further setting a reporting bit for the track.

43. The computer program product of claim 34, wherein the second instructions include fourth instructions for rejecting the update write if the data track block size for the data track is not equal to a cylinder table entry block size.

44. The computer program product of claim 34, wherein the first instructions include instructions for determining if a bit in a track bitmap in the cylinder table entry identifies the data track.

45. A computer program product in a computer readable medium for creating a cylinder table for a direct access storage device, comprising:

first instructions for determining if data track is a candidate for a future quick write operation;

second instructions for creating a cylinder table entry for a cylinder corresponding to the data track if the data track is determined to be a candidate for a future quick write operation; and wherein the first instructions include third instructions for determining if a number of records in the data track are greater than one and determining if a record length of a record in position zero is a predetermined size.

46. The computer program product of claim 45, wherein the third instructions include instructions for determining if records of the data track have a same data size.

47. The computer program product of claim 45, wherein the first instructions include instructions for determining if the data track is full of records and determining if the records are consecutive.

48. The computer program product of claim 45, wherein the first instructions further include instructions for determining if a count field head number for the data track is the same as a home address head number.

49. The computer program product of claim 45, wherein the first instructions further include instructions for determining if a count field cylinder number for all records in the data track are the same.

50. The computer program product of claim 45, wherein the cylinder table entry includes a field for identifying data tracks in a cylinder, a field for identifying a cylinder number of the cylinder, and a field for identifying a record length of records in data tracks of the cylinder.

51. The computer program product of claim 50, wherein the cylinder table entry further includes a field for a seed independent value and a report entry.

52. The computer program product of claim 51, wherein the report entry identifies whether a quick write operation could not be accepted because either the data track layout was not known or the data track does not conform with a data track layout of a quick write candidate.

* * * * *